Sept. 10, 1957   R. A. FINDLAY   2,806,071
SOLVENT EXTRACTION OF AROMATICS FROM HYDROCARBONS
Filed Jan. 21, 1953
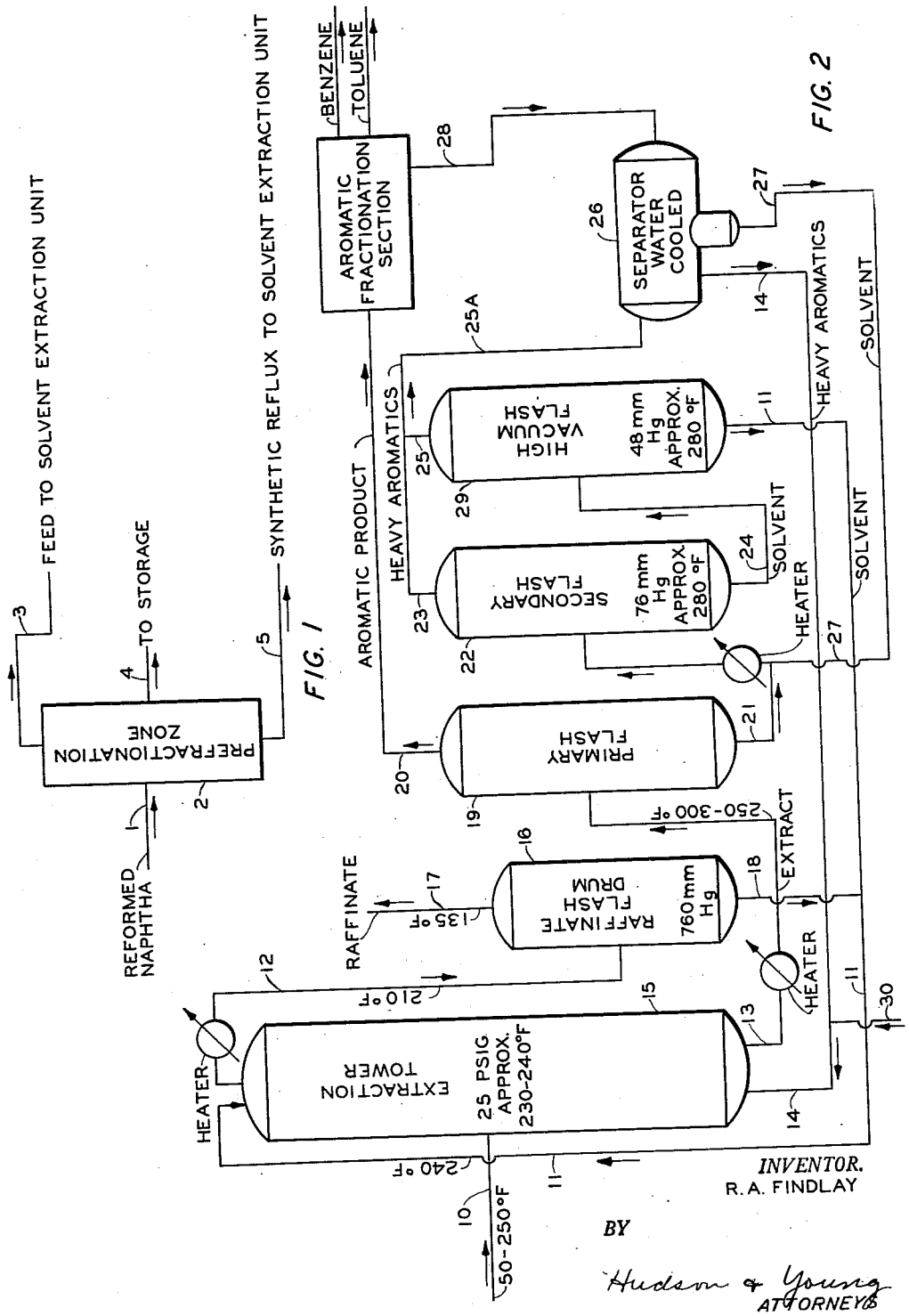
INVENTOR.
R. A. FINDLAY
BY
Hudson & Young
ATTORNEYS United States Patent Office 2,806,071
Patented Sept. 10, 1957

2,806,071

SOLVENT EXTRACTION OF AROMATICS FROM HYDROCARBONS

Robert A. Findlay, Bartlesville, Okla., assignor to Phillips Petroleum Company, a corporation of Delaware Application January 21, 1953, Serial No. 332,317

10 Claims. (Cl. 260—674)

This invention relates to the solvent extraction of aromatics from hydrocarbons containing them, for example, a reformed naphtha. In one aspect the invention relates to an operation in which an aromatic rich extract phase is recovered from an extraction zone employing a reflux, for said zone, which does not require that it be fractionated from the solvent which is employed. In another aspect the invention relates to a solvent extraction process in which the reflux employed is derived from the feed stock to the process externally of the solvent extraction zone. In still another aspect of the invention it relates to the preparation of a synthetic reflux for the solvent extraction zone. Yet another aspect of the invention lies in the provision of a synthetic reflux for the solvent extraction zone by treating the feed stock before it enters said zone to remove a portion therefrom as set forth and described herein.

It has been known to separate aromatics from hydrocarbons, for example, benzene and/or toluene from low-boiling hydrocarbon fractions containing them together with more saturated or paraffinic fractions. In one such process which has been described, an aromatics-containing feed stock is introduced into a solvent extraction zone wherein it is contacted with a solvent, for example, a glycol such as diethylene glycol, which is introduced thereinto at a locus above the introduction of the feed stock resulting in the formation within said zone of a raffinate phase and an extract phase. The raffinate phase, essentially saturated or paraffinic in character, travels upwardly, is washed with water introduced at a locus above the point or locus of solvent introduction, thus removing solvent therefrom, and is then removed to storage. The extract phase containing aromatics, solvent and said water is then stripped to obtain an aromatics and steam overhead and a solvent bottoms. The aromatics and steam are separated by condensing water therefrom and a portion of the aromatics thus obtained is returned to the solvent extraction zone as a natural reflux therefor. It will be noted that all of the reflux which is employed is a portion of the aromatics-containing hydrocarbon extract recovered from the extraction zone and therefore it must be heated and vaporized to separate it from the solvent before it can be recovered and employed as reflux for said extraction zone.

It is an object of this invention to provide a solvent extraction system or process for the recovery of aromatics in which the reflux is a synthetic reflux, which is obtained in a manner, and is of a character, such that it does not have to be heated and/or vaporized to recover it from the solvent. It is a further object of this invention to provide a solvent extraction system or process for the recovery of aromatics in which no water is employed to separate the solvent from the raffinate.

It has now been found that by prefractionating a naphtha, for example a catalytically reformed gasoline, rich in aromatics, to provide a low-boiling fraction containing predominantly $C_6$, $C_7$, $C_8$ hydrocarbon, for example boiling in a range 170–320° F., which is used as feed stock for a solvent extraction step with, for example, diethylene glycol (B. P. 472° F.) as a solvent, an intermediate fraction containing hydrocarbons boiling, for example, in a range 320–325° F. which is removed from the process and a fraction containing hydrocarbons boiling above about 325° F., but substantially completely below the boiling point of the solvent, e. g. below 472° F. when diethylene glycol is used, which is used as a synthetic reflux for the solvent extraction step, it is not necessary to heat the same to vaporize it to recover it as a reflux for the extraction zone. Indeed, as will be evident to the reader of this disclosure, the last-mentioned fraction which is recovered as a synthetic reflux is never vaporized in the process but can be recovered as a bottoms material from the prefractionation zone, passed into the bottom of the solvent extraction zone and removed ultimately from the system with the raffinate at the top of the solvent extraction zone. Thus, any reflux which passes out the bottom of the solvent extraction zone together with solvent and aromatics extract can be recovered as a bottoms material together with the solvent upon flashing of the aromatics therefrom. Thus, the reflux is returned together with the solvent to the extraction zone where it is washed out from the solvent by the raffinate.

Thus, according to one embodiment of the invention there has been provided a solvent extraction process, adapted to recover aromatics from a hydrocarbon stream containing the same which comprises fractionating such a stream to produce an aromatics concentrate as an overhead, an intermediate sidestream which is withdrawn from the process and a bottoms stream; solvent extracting the said aromatics concentrate with a solvent higher boiling than said concentrate and using said bottoms stream as a reflux or stripping fluid for said extraction zone. The extract phase withdrawn from the solvent extraction zone is heated and flashed to recover aromatics as vapors which are separately condensed and bottoms containing the solvent and the portion of reflux or stripping liquid removed with the extract. The combined solvent and stripping liquid is passed to the top of the extraction zone in which the stripping liquid is washed from the solvent by the raffinate phase.

As feed stocks to the process, as above set out, there can be used any suitable aromatics-containing hydrocarbon stream of sufficiently wide boiling range, extending sufficiently above the highest boiling of the aromatics to be recovered, to enable the operator to provide the synthetic reflux by prefractionation.

Also according to another embodiment of the invention, it is possible to obtain the aromatics concentrate to be solvent extracted from one source and the synthetic reflux from another source and therefore it is clear that in at least one of its aspects the invention is not limited to the prefractionation of a single hydrocarbon stream to produce both the aromatics concentrate and the synthetic reflux.

Thus, any aromatic-containing stock in which the aromatics are present in substantial amounts, for example 25–50 percent or more and which can be fractionated to produce the desired solvent extraction zone feed stock, can be used and if it does not contain within its boiling range the synthetic reflux employed according to this invention such a reflux can be obtained from another source, in which event the reflux should always be chosen to have an initial boiling point higher than the highest boiling point of the aromatics to be recovered and not as high as the boiling point of the solvent, in the case of diethylene glycol 472° F. or somewhat lower.

Thus, when a benzene cut of a reformed naphtha is the feed stock to the extraction zone then any cut of the same reformed naphtha or a precut from the original naphtha boiling above toluene can be utilized as a reflux, satisfying this invention. If a benzene-toluene cut is utilized as feed to the extractor than the reflux should have an initial boiling point equal to or above the xylenes.

For broader boiling range aromatic feeds, heavier, i. e., higher boiling, materials should be used. These heavy materials should have initial boiling points approximately 25° or more above the boiling range of the desired product. The heavy reflux need not be limited to high aromatic stocks and consequently any heavy naphtha that is available can be utilized provided it has the desired high boiling range.

While the now preferred embodiment is described with reference to a platformed naphtha which is essentially a catalytically reformed naphtha, prepared in presence of a platinum-containing catalyst, it is noted that the invention provides in essence a modus operandi and is applicable to other naphthas, or oils, one skilled in the art needing but to determine by routine tests the characteristics of the feed stock and the synthetic reflux required therefor to embody the concept of the present invention in a process to treat said feedstock and to obtain optimum results. When this has been done the operating conditions to be maintained in the process can be supplied by one skilled in the art following the teachings of this disclosure.

Referring now to the drawing, Figure 1 diagrammatically illustrates a prefractionation zone in which a reformed naphtha is prefractionated according to the invention to provide overhead an aromatic-containing fraction to be treated by solvent extraction for recovery of aromatics therefrom, as exemplified in Figure 2, and to provide a synthetic reflux for said extraction.

Figure 2 diagrammatically illustrates an embodiment of the invention in which a solvent extraction of a reformed naphtha is accomplished according to the invention employing as reflux a naphtha fraction higher boiling than the naphtha subjected to solvent extraction.

Referring now to Figure 1, a reformed motor fuel cut or naphtha boiling in the range 100° F. to 460° F. is fed by conduit 1 to prefractionation zone 2 wherein it is prefractionated to provide as an overhead through conduit 3 a feed to a solvent extraction zone, for example, as shown at 15 in Figure 2 hereof. This overhead will have a boiling range of 100° F. to 300° F. A second fraction removed to storage through conduit 4 will have a boiling range of 300° F. to 340° F. Finally, a third or bottoms fraction is removed through conduit 5 and forms a synthetic reflux to be employed in the solvent extraction zone 15 of Figure 2. This fraction will boil in the range 340° F. to 460° F.

Referring now to Figure 2 of the drawing, a feed stock, for example as prepared and described in connection with Figure 1, is passed through conduit 10 into extraction tower 15 wherein it is contacted with a solvent, for example, diethylene glycol. The feed will be at a temperature in the range 50–250° F., preferably at about 100° F. Diethylene glycol solvent fed to the upper portion of the extraction tower at a suitable temperature through conduit 11 contacts the feed countercurrently, causing the production of two products, namely, a raffinate phase removed overhead through conduit 12 and an extract phase removed as bottoms through conduit 13. Extraction tower 15 is preferably operated at a pressure of approximately 25 p. s. i. g. and a temperature of 230–240° F., although operating conditions outside these values may be employed with good results. Heavy synthetic reflux obtained, for example as described in connection with Figure 1, is introduced through conduit 30 and conduit 14 into the bottom portion of tower 15. The extract in conduit 13 is flashed in primary flash zone or tower 19 to separate therefrom a desired aromatic product which is passed through conduit 20 into the aromatic fractionation section wherein it can be further fractionated into, say, benzene and toluene. Bottoms from primary flash zone 19 are removed through conduit 21 and passed by way of conduit 27 into secondary flash zone or tower 22 operated at reduced pressure. In this zone there is obtained and recovered overhead through conduit 23 a heavy aromatics fraction which is passed through conduit 25A to phase separator 26. Bottoms from secondary flash zone 22 consisting substantially of solvent but containing some heavy aromatics is passed through conduit 24 into a high vacuum flash zone or tower 29. Heavy aromatics liberated in tower 29 are passed by way of conduits 25 and 25A to phase separator 26. Solvent bottoms are passed from tower 29 by way of conduit 11 to the upper portion of the extraction tower. Heavy aromatics recovered from phase separator 26 in which solvent and aromatics are separated are passed by way of conduit 14, together with synthetic reflux introduced through conduit 30, into the bottom portion of extract tower 15. Some heavy aromatics will remain in the solvent withdrawn from tower 29 through conduit 11 and by virtue of conditions prevailing at the top of tower 15 will be washed out together with the raffinate removed from the top thereof through conduit 12 from which it will be obtained at production rates. Thermal savings are effected by leaving heavy aromatics in the solvent which is returned to the extractor. Such heavy aromatics are transferred to the raffinate without the necessity of supplying their latent heat of vaporization. The raffinate is passed through conduit 12 into raffinate flash drum 16 from which raffinate is taken overhead through conduit 17. Solvent containing some heavy aromatics is removed through conduit 18 and passed by way of conduit 11 to the upper portion of tower 15.

From the flash zones 22 and 29 there can be obtained in the heavy aromatics taken overhead therefrom some solvent which will be recovered in the phase separator 26.

In the foregoing description of a diagrammatic showing of an embodiment of the invention it will be understood that certain heaters or heat exchangers, pumps, valves and other equipment have been omitted for sake of simplicity of description. These can be supplied by one skilled in the art in possession of this disclosure.

Certain operating conditions have been indicated upon Figure 2 to more fully illustrate the embodiment described. However, it is to be understood the invention is not to be limited by any one or more of the said conditions. Thus, it is possible and oftentimes desirable to prefractionate a virgin or cracked naphtha to provide a feed to a naphtha reforming zone, which then can be fed to tower or column 15 directly, but preferably is fed to tower 2, and a synthetic reflux which is fed to tower 15 by way of conduits 30 and 14. Further, it is clear that the essence of the relationship of the boiling ranges of the several fractions which are extant in the process lies in that they shall be separable as described, rather than in any particular or specific boiling range of temperature.

Further, although certain ranges of temperature have been given in connection with the description of the drawing, the said ranges are not limiting upon the claims, nor are said ranges necessarily to be as given when practicing the process for the recovery of different products. The overhead fraction, when benzene is desired to be produced, will boil, preferably, in the range 120–200° F.; when toluene is also desired to be produced, the range will be, preferably, 120–250° F., and the middle cut, if toluene is left in the motor fuel produced, can boil in the range 235–300° F., whereas if benzene, toluene and xylenes are the desired products, then a fraction boiling in the range 300–340° F., as given, can be removed as the middle cut. Thus, depending upon the product to be recovered, the initial boiling temperature of the bottoms fraction will be approximately 235, 300, or 340° F.

In Table I is shown a comparison of certain major items in the cost of extraction processes carried out with diethylene glycol as the selective solvent, the reflux being obtained by three different methods. In column (1) the reflux is supplied in the form of normal pentane; in column (2) a portion of the aromatic product is returned to the column as natural reflux; in column (3) the process of this invention is employed. It will be noted that substantial savings in steam requirements and heat exchanger surface area are shown by the process of my invention.

TABLE I

*Comparison of extraction processes employing diethylene glycol solvent and various types of reflux*

|  | (1) Pentane Reflux | (2) Natural Reflux | (3) Higher Boiling Reflux |
| --- | --- | --- | --- |
| Relative Cost of Extraction Tower | 100 | 29 | 88 |
| Heat Exchanger Surface Area (Square Feet) | 22,832 | 25,800 | 15,200 |
| Steam Rate (Pounds per Hour) | 92,300 | 97,300 | 55,900 |

Reasonable variation and modification are possible within the scope of the foregoing disclosure, drawing, and the appended claims to the invention, the essence of which is that there has been provided a process for the recovery of aromatics from hydrocarbons employing a solvent extraction step in which the reflux which is employed has a boiling range higher than that of the aromatics to be recovered and lower than the boiling point of the solvent employed.

I claim:

1. In the selective solvent extraction of an aromatic hydrocarbon contained in a naphtha the steps which comprise feeding said hydrocarbon fraction to a selective solvent extraction zone, in said zone contacting said hydrocarbon fraction with a solvent which will extract selectively said aromatic hydrocarbon from said hydrocarbon fraction forming a raffinate phase and an extract phase, refluxing the extract phase containing section of said zone with a synthetic hydrocarbon reflux having a boiling temperature above the boiling temperature of the aromatic to be extracted and below the boiling temperature of said solvent, removing extract phase from said zone, flashing aromatic hydrocarbon from said extract phase, recovering said aromatic hydrocarbon as a product of the process, and returning the flashed extract phase which comprises the solvent and said hydrocarbon reflux to said extraction zone.

2. An extraction according to claim 1 wherein the naphtha is a reformed naphtha and the selective solvent is diethylene glycol.

3. An extraction according to claim 1 wherein the aromatic is benzene contained in a benzene cut of a naphtha fraction and the reflux boils above said benzene cut.

4. An extraction according to claim 3 wherein the reflux is obtained as a precut of the naphtha from which the benzene cut is obtained and wherein said reflux boils at least as high as the boiling point of toluene.

5. An extraction according to claim 1 wherein the aromatic is at least one of benzene and toluene contained in a benzene-toluene cut of a naphtha fraction, and the reflux boils above said benzene-toluene cut.

6. An extraction according to claim 5 wherein the reflux is obtained as a precut of the naphtha fraction from which the benzene-toluene cut is obtained and wherein said reflux boils at least as high as the boiling point of xylene.

7. In the selective solvent extraction of an aromatic hydrocarbon contained in a hydrocarbon fraction the steps which comprise feeding said hydrocarbon fraction to a selective solvent extraction zone, in said zone contacting said hydrocarbon fraction with a solvent which will extract selectively said aromatic hydrocarbon from said hydrocarbon fraction forming a raffinate phase and an extract phase, a refluxing the extract phase containing section of said zone with a synthetic hydrocarbon reflux having a boiling temperature above the boiling temperature of the aromatic to be extracted and below the boiling temperature of said solvent, removing extract phase from said zone, flashing aromatic hydrocarbon from said extract phase, recovering said aromatic hydrocarbon as a product of the process, and returning the flashed extract phase which comprises the solvent and said hydrocarbon reflux to said extraction zone as the solvent with which said hydrocarbon fraction is contacted therein.

8. In the selective solvent extraction of aromatics of the type of benzene and toluene from a naphtha containing the same, which comprises fractionating said naphtha to obtain a fraction containing at least one of benzene and toluene and a fraction boiling above said first mentioned fraction; passing said first mentioned fraction into a solvent extraction zone and contacting it therein with a solvent which acts selectively to extract aromatics thus forming in said zone a raffinate phase and an extract phase; refluxing said extract phase with said second mentioned fraction, said second mentioned fraction having a boiling temperature above the boiling temperature of at least one of the benzene and toluene to be extracted and below the boiling temperature of said solvent; removing extract phase from said extraction zone; flashing said extract phase to recover aromatics therefrom as a product of the process and returning the flashed extract phase which comprises the solvent and said second-mentioned fraction to said extraction zone as the selective solvent with which said first mentioned fraction is contacted.

9. In the selective solvent extraction of a reformed naphtha the steps which comprise fractionating said naphtha to obtain as an overhead fraction a hydrocarbon stream boiling in the approximate range of 100—300° F., a side fraction boiling within the approximate range of 300–340° F., and a bottoms fraction boiling in the approximate range 340–460° F.; removing said side fraction as a product of the process; passing said overhead fraction into a selective solvent extraction zone and therein contacting it with a solvent of diethylene glycol, thus forming a raffinate phase and an extract phase in said zone, passing said bottoms fraction into said extract phase in said zone as a synthetic reflux therefor; removing extract phase from said zone; flashing said extract phase to recover aromatics therefrom, thus obtaining as residue from said flashing operation substantially all of said solvent and said bottoms fraction; passing said residue to the raffinate phase in said solvent extraction zone, thus returning solvent to said zone and removing said raffinate phase, containing some heavy aromatics of said bottoms fraction, from said zone.

10. A process according to claim 9 wherein said fraction boiling in the approximate range 300–340° F. and the hydrocarbons in said raffinate phase removed from said solvent extraction zone are blended together to form a motor fuel product.

References Cited in the file of this patent

UNITED STATES PATENTS

| 2,079,885 | Voorhees | May 11, 1937 |
| 2,261,799 | Franklin | Nov. 4, 1941 |
| 2,327,187 | Hill | Aug. 17, 1943 |
| 2,377,736 | White | Jan. 5, 1945 |
| 2,380,853 | Linn et al. | July 31, 1945 |
| 2,407,820 | Durrum | Sept. 17, 1946 |
| 2,552,198 | Mayland et al. | May 8, 1951 |

(Other references on following page)

UNITED STATES PATENTS

| | | |
|---|---|---|
| 2,645,596 | Axe | July 14, 1953 |
| 2,663,670 | Francis et al. | Dec. 22, 1953 |
| 2,604,434 | Clarke | July 22, 1952 |
| 2,610,108 | Packie | Sept. 9, 1952 |
| 2,689,819 | Shelton et al. | Sept. 21, 1954 |
| 2,693,495 | Hastings et al. | Nov. 2, 1954 |

OTHER REFERENCES

Chemical Engineers Handbook, edited by Perry, second edition (1941), McGraw-Hill Book Co., New York, N. Y., page 1219.

Resen: "The Oil and Gas Journal," June 16, 1952, pages 313–316.

Ratliff et al.: "Petroleum Refiner," May 1954, vol. 33, pages 151–155.